Oct. 30, 1962     E. H. KOPP     3,060,582
TOOTH ROOT EXTRACTOR
Filed Aug. 10, 1959
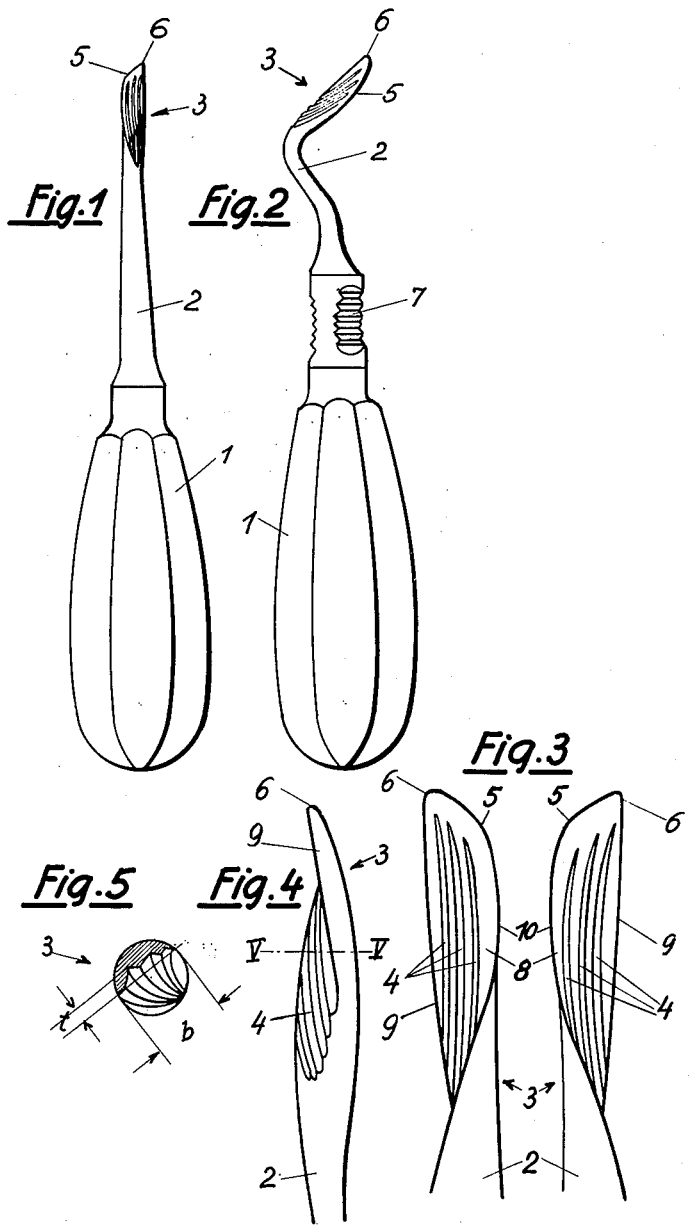
INVENTOR.
Erich H. Kopp
BY
Lowry & Rinehart
ATTYS.

United States Patent Office 3,060,582
Patented Oct. 30, 1962

3,060,582
TOOTH ROOT EXTRACTOR
Erich Hermann Kopp, Lochwiesenweg, Pfalzgrafenweiler (Wurttemberg), Germany
Filed Aug. 10, 1959, Ser. No. 832,839
Claims priority, application Germany Aug. 9, 1958
5 Claims. (Cl. 32—61)

This invention relates to a tooth root extractor as it is used by dentists for loosening and extracting tooth roots and root residuals from out of the jaw.

The known root extractors consist of a normally round shank which has a bulb-shaped handle at one end, whereas the opposite end, serving as operating end, is flattened and has a spoon- or blade-like configuration. When in use, this latter end is forced between the root and the osseous wall of the alveolus and the root is then displaced laterally by lever action so as to loosen the root. When using these extractors, a considerable employment of force is frequently necessary. This, of course, entails serious inconveniences to the patient and, besides, injuries of the jaw may occur.

It is the object of the invention to eliminate these drawbacks and to provide a tooth root extractor which permits a quick and rapid removal of a root by employing only moderate force and thus gives the gums the most careful treatment possible.

According to the invention these objects are attained by the provision of a tooth root extractor which comprises a substantially round shank, a bulb-shaped handle mounted at one end thereof, a blade at the opposite end of said shank, and a substantially helical-shaped groove in said blade, said helical-shaped groove terminating in a point formed by the blade, the depth of said groove being less than half its width and said shank tapering in diameter towards the blade.

The blade may have two blunt lateral edges and a sharp frontal edge including the point. One of said lateral edges may pass through said point and extend substantially rectilinear in the longitudinal direction of the extractor, whereas the other lateral edge is curved.

The point of the extractor may have an eccentric position and the frontal edge of the blade form a chamfer ascending towards said point.

The groove may have a length which corresponds substantially to the length of the root to be extracted.

The groove may be provided with likewise helical-curved guide riffles or flutes.

The groove may be cured in either direction.

Finally, the extractor may be provided with a conventional straight shank or with a bent shank, depending on whether its is to be used for a root in the upper or lower jaw of a patient.

Some preferred embodiments of the invention will now be described by way of example and with reference to the accompanying drawing, in which:

FIG. 1 is an elevational view of a tooth root extractor according to the invention with a straight shank;

FIG. 2 is a view similar to FIG. 1 but showing a tooth root extractor with a bent shank;

FIG. 3 is a fragmentary elevational view of two root extractors with oppositely directly substantially helical-shaped and round-nose chisel-like operating ends;

FIG. 4 is a similar view but showing the right-hand root extractor of FIG. 3 turned by 90°, and FIG. 5 is a cross section taken on the line V—V of FIG. 4.

As shown in FIGS. 1 and 2, a root extractor according to the invention consists of a round shank 2 which has a bulb-shaped handle 1 at one of its ends. The opposite end of the shank 2 serves as operating end and forms a blade 3. The shank 2 tapers in diameter towards the blade 3 and is either straight as shown in FIG. 1 or bent as shown by way of example in FIG. 2.

The blade 3 forms a point 6 which is eccentrically located in relation to the shank 2. As is shown in FIG. 3, the blade 3 is defined by a frontal edge 5 and two lateral edges 9 and 10. The lateral edge 9 extends substantially rectilinear and passes through the point 6, whereas the lateral edge 10 is curved.

The frontal edge 5 of the blade forms a chamfer ascending from the curved lateral edge 10 towards the point 6 of the extractor.

This novel construction of the point 6 of the extractor enables the extractor to be easily and safely applied to the root.

The blade 3 of the tapering shank 2 is provided with a groove 8 which extends in a helical path, like the groove of a drill, up to the point 6.

While the width of the groove 8 remains substantially constant over the entire length thereof, its depth $t$ is less than half its width $b$ so that the groove 8 has a slightly concave cross section (FIG. 5) and runs out flat at its free end.

The groove 8 has a length which corresponds substantially to the length of the root to be extracted. In the embodiments shown, the groove 8 describes approximately half a turn round the axis of the extractor.

The root extractor is manipulated as follows:

The extractor is, as usual, so applied that the point 6 when a moderate vertical pressure is exerted, can penetrate into the gap between the root of the tooth and the osseous alveolus. Now the root extractor is no longer forced sidewise as it has been hitherto practised but is turned about the axis of the blade following the helical shape of the groove so as to circularly go round the root according to the anatomical conditions thereof, thus cutting out the root. The twisted blade with its wedge-shaped tapering end simultaneously causes the root to be lifted.

The inner face of the groove 8 is conveniently provided with one or several riffles or flutes 4 which likewise extend in a helical path in the longitudinal direction of the groove 8. These riffles or flutes improve the efficiency of the extractor by preventing relative movements between the extractor and the root at right angles to the groove.

The groove may be cured in either direction.

All edges are blunt excepting the frontal edge 5 which is sharp.

The bent shank shown in FIG. 2 is adapted to be applied to the lower jaw and may for safe manipulation be provided with a finger rest 7 which can be provided with a smooth knurled surface.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

I claim:

1. A tooth root extractor for removing tooth roots, root residuals, etc., comprising a shank terminating at one end in a blade having an eccentric point, two lateral edges and a frontal edge, one of said lateral edges passing through said point and extending substantially rectilinearly in the longitudinal direction of the extractor, the other of said lateral edges being helically curved, said blade having a helical groove defined by said helically curved lateral edge and having a depth less than half its width, said blade being adapted to be introduced into the alveolus in the direction of the tooth axis, and said groove terminating in said eccentric point.

2. Tooth root extractor as claimed in claim 1, wherein said frontal edge of the blade forms a chamber ascending towards the point of the blade.

3. Tooth root extractor as claimed in claim 1, wherein the groove passes through approximately half a turn about the axis of the extractor.

4. Tooth root extractor as claimed in claim 1, wherein the groove has at least one riffle which is likewise helical-shaped.

5. Tooth root extractor as claimed in claim 1, wherein the lateral edges of the blade are blunt and the frontal edge including the point is sharp.

References Cited in the file of this patent
UNITED STATES PATENTS

| | | |
|---|---|---|
| 2,002,245 | McDaniel | May 21, 1935 |
| 2,674,799 | Fraser | Apr. 13, 1954 |